US012771577B2

(12) United States Patent
Chen et al.

(10) Patent No.: US 12,771,577 B2
(45) Date of Patent: Oct. 20, 2026

(54) SIGNAL DETECTION METHOD AND APPARATUS

(71) Applicant: Beijing Xiaomi Mobile Software Co., Ltd., Beijing (CN)

(72) Inventors: Dong Chen, Beijing (CN); Liangang Chi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 138 days.

(21) Appl. No.: 18/719,705

(22) PCT Filed: Dec. 14, 2021

(86) PCT No.: PCT/CN2021/138021
§ 371 (c)(1),
(2) Date: Jun. 13, 2024

(87) PCT Pub. No.: WO2023/108436
PCT Pub. Date: Jun. 22, 2023

(65) Prior Publication Data

US 2025/0055730 A1 Feb. 13, 2025

(51) Int. Cl.
*H04L 25/02* (2006.01)
*H04L 41/16* (2022.01)

(52) U.S. Cl.
CPC ............ *H04L 25/024* (2013.01); *H04L 41/16* (2013.01)

(58) Field of Classification Search
CPC ......... G06N 3/02; H04L 25/024; H04L 41/16; H04B 7/0413; H04B 17/391
See application file for complete search history.

(56) References Cited

U.S. PATENT DOCUMENTS

| | | | | |
|---|---|---|---|---|
| 2019/0356516 A1* | 11/2019 | Cao | ..................... | H04L 25/0204 |
| 2022/0188690 A1* | 6/2022 | Rawat | .................... | G06V 10/82 |
| 2022/0303159 A1* | 9/2022 | Nguyen | .............. | H04L 25/0204 |

(Continued)

FOREIGN PATENT DOCUMENTS

| | | |
|---|---|---|
| CN | 101674160 A | 3/2010 |
| CN | 103532609 A | 1/2014 |
| CN | 112261685 A | 1/2021 |

OTHER PUBLICATIONS

International Search Report issued Aug. 23, 2022 in PCT/CN2021/138021, filed on Dec. 14, 2021, 4 pages (with English Translation).

(Continued)

*Primary Examiner* — Syed Haider
(74) *Attorney, Agent, or Firm* — Oblon, McClelland, Maier & Neustadt, L.L.P.

(57) ABSTRACT

The present disclosure provides signal detection methods and apparatuses. A method executed by a network side device includes: obtaining a channel matrix by performing a channel estimation on a signal received from a terminal device; performing a data preprocessing on the channel matrix to obtain a first matrix and a first vector; and inputting the first matrix and the first vector into a trained deep learning model to obtain an estimated detection signal, wherein the trained deep learning model includes N trained convolutional network models, and N is a positive integer equal to a number of transmitting antennas.

19 Claims, 5 Drawing Sheets

(56) References Cited

U.S. PATENT DOCUMENTS

| | | | | |
|---|---|---|---|---|
| 2022/0405602 | A1* | 12/2022 | Yoo | G06N 3/088 |
| 2023/0082536 | A1* | 3/2023 | Hoydis | H04L 1/0041<br>706/25 |

OTHER PUBLICATIONS

Zhang et al. "Meta Learning-based MIMO Detectors: Design, Simulation, and Experimental Test", arXiv:2012.04379v1 [eess.SP] Dec. 8, 2020, 35 pages.
Samuel et al. "Deep MIMO Detection", arXiv:1706.01151v1 [stat.ML] Jun. 4, 2017, 5 pages.
Khan et al. "Deep-Learning-Aided Detection for Reconfigurable Intelligent Surfaces", arXiv:1910.09136v2 [eess.SP] Jul. 27, 2020, 8 pages.
Gao et al. "Sparsely Connected Neural Network for Massive MIMO Detection", EasyChair Preprint, Jul. 24, 2018, 7 pages.
Mohammad et al. "Complexity-Scalable Neural Network Based MIMO Detection With Learnable Weight Scaling", arXiv:1909.06943v1 [eess.SP] Sep. 12, 2019, 13 pages.
Sun et al. "Learning to Search for MIMO Detection", IEEE, 2020, 14 pages.
Santos et al."A Double EP-Based Proposal for Turbo Equalization", IEEE Signal Processing Letters, vol. 27, 2020, 5 pages.
He et al. "Model-Driven Deep Learning for MIMO Detection", arXiv:1907.09439v2 [cs.IT] Mar. 19, 2021, 13 pages.
Shlezinger et al. "ViterbiNet: A Deep Learning Based Viterbi Algorithm for Symbol Detection", arXiv:1905.10750v2 [cs.LG] Sep. 29, 2020, 28 pages.

* cited by examiner

SIGNAL DETECTION METHOD AND APPARATUS

CROSS-REFERENCE TO RELATED APPLICATIONS

The present application is a U.S. National Stage of International Application No. PCT/CN2021/138021, filed on Dec. 14, 2021, the entire disclosure of which is incorporated herein by reference for all purposes.

TECHNICAL FIELD

The present disclosure relates to the field of communication technology, and in particular to signal detection methods and apparatuses.

BACKGROUND

The large-scale millimeter wave MIMO (multiple-input multiple-output) technology is regarded as a key technology in future wireless communication, and is also a fundamental component in 5G wireless communication networks.

The large-scale millimeter-wave MIMO has a larger number of transceiver antennas compared with traditional MIMO technology, which brings performance advantages, but at the same time, the complexity of signal detection also increases. Therefore, how to reduce the complexity of signal detection in the large-scale millimeter wave MIMO is an urgent problem to be solved.

SUMMARY

Embodiments of the present disclosure provide signal detection methods and apparatuses.

In a first aspect, an embodiment of the present disclosure provides a signal detection method, which includes: obtaining a channel matrix by performing channel estimation on a signal received from a terminal device; obtaining a first matrix and a first vector by performing data preprocessing on the channel matrix; and obtaining an estimated detection signal by inputting the first matrix and the first vector to a trained deep learning model, wherein the trained deep learning model includes N trained convolutional network models, and N is a positive integer and is equal to a number of transmission antennas.

In a second aspect, an embodiment of the present disclosure provides another signal detection method, which includes: sending a signal and an intermediate parameter, wherein the intermediate parameter is obtained by training a meta-learning parameter learning model based on network fusion.

In a third aspect, an embodiment of the present disclosure provides a communication apparatus, which has some or all functions of a network-side device in the method for implementing the above first aspect. For example, the functions of the communication apparatus can have functions in some or all embodiments of the present disclosure, and can also have the function of independently implementing any embodiment of the present disclosure. The functions can be implemented by hardware, or by hardware executing corresponding software. The hardware or software includes one or more units or modules corresponding to the above functions.

In a fourth aspect, an embodiment of the present disclosure provides another communication apparatus, which has some or all functions of a terminal device in the method for implementing the above second aspect. For example, the functions of the communication apparatus can have functions in some or all embodiments of the present disclosure, and can also have the function of independently implementing any embodiment of the present disclosure. The functions can be implemented by hardware, or by hardware executing corresponding software. The hardware or software includes one or more units or modules corresponding to the above functions.

In a fifth aspect, an embodiment of the present disclosure provides a communication apparatus, which includes a processor, and when the processor executes a computer program in a memory, the method described in the first aspect is executed.

In a sixth aspect, an embodiment of the present disclosure provides a communication apparatus, which includes a processor, and when the processor executes a computer program in a memory, the method described in the second aspect is executed.

In a seventh aspect, an embodiment of the present disclosure provides a communication apparatus, which includes a processor and a memory, wherein a computer program is stored in the memory, and the processor executes the computer program stored in the memory to cause the communication apparatus to perform the method described in the first aspect.

In an eighth aspect, an embodiment of the present disclosure provides a communication apparatus, which includes a processor and a memory, wherein a computer program is stored in the memory, and the processor executes the computer program stored in the memory to cause the communication apparatus to perform the method described in the second aspect.

In a ninth aspect, an embodiment of the present disclosure provides a communication apparatus, which includes a processor and an interface circuit, wherein the interface circuit is configured to receive code instructions and transmit the code instructions to the processor, and the processor is configured to execute the code instructions to cause the apparatus to perform the method described in the first aspect.

In a tenth aspect, an embodiment of the present disclosure provides a communication apparatus, which includes a processor and an interface circuit, wherein the interface circuit is configured to receive code instructions and transmit the code instructions to the processor, and the processor is configured to execute the code instructions to cause the apparatus to perform the method described in the second aspect.

In an eleventh aspect, an embodiment of the present disclosure provides a communication system, which includes the communication apparatus described in the third aspect and the communication apparatus described in the fourth aspect, or includes the communication apparatus described in the fifth aspect and the communication apparatus described in the sixth aspect, or includes the communication apparatus described in the seventh aspect and the communication apparatus described in the eighth aspect, or includes the communication apparatus described in the ninth aspect and the communication apparatus described in the tenth aspect.

In a twelfth aspect, an embodiment of the present disclosure provides a non-transitory computer-readable storage medium for storing instructions used by the network-side device, and when the instructions are executed, the network-side device executes the method described in the first aspect.

In a thirteenth aspect, an embodiment of the present disclosure provides a non-transitory readable storage medium for storing instructions used by the terminal device, and when the instructions are executed, the terminal device executes the method described in the second aspect.

In a fourteenth aspect, the present disclosure also provides a computer program product including a computer program, which, when runs on a computer, causes the computer to perform the method described in the first aspect.

In a fifteenth aspect, the present disclosure also provides a computer program product including a computer program, which, when runs on a computer, causes the computer to perform the method described in the above second aspect.

In a sixteenth aspect, the present disclosure provides a chip system, which includes at least one processor and an interface, and is used for the network-side device to implement the functions related to the first aspect, for example, determining or processing at least one of data and information related to the above method. In an example design, the chip system further includes a memory, and the memory is used for storing computer programs and data necessary for the network-side device. The chip system can be composed of chips, and can also include chips and discrete elements.

In a seventeenth aspect, the present disclosure provides a chip system, which includes at least one processor and an interface, and is used for a terminal device to implement the functions related to the second aspect, for example, determining or processing at least one of data and information related to the above method. In an example design, the chip system further includes a memory, and the memory is used for storing computer programs and data necessary for the terminal device. The chip system can be composed of chips, and can also include chips and discrete elements.

In an eighteenth aspect, the present disclosure provides a computer program which, when runs on a computer, causes the computer to perform the method described in the first aspect.

In a nineteenth aspect, the present disclosure provides a computer program which, when runs on a computer, causes the computer to perform the method described in the second aspect.

BRIEF DESCRIPTION OF THE DRAWINGS

In order to more clearly illustrate the technical solutions in the embodiments or background art of the present disclosure, the accompanying drawings to be used in the embodiments or background art of the present disclosure will be described below.

DETAILED DESCRIPTION

In order to better understand a signal detection method disclosed by embodiments of the present disclosure, a communication system applicable to embodiments of the present disclosure is first described below.

Figure 1:
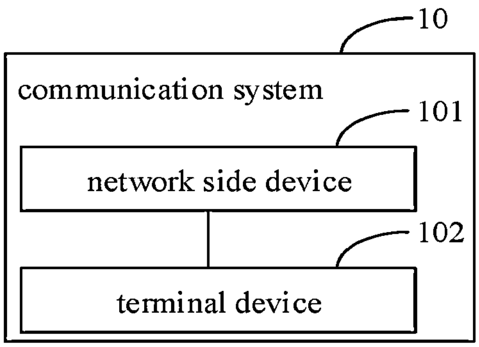
FIG. 1 is an architectural diagram of a communication system provided by embodiments of the present disclosure.

Referring to FIG. 1, FIG. 1 shows a schematic diagram of an architecture of a communication system 10 provided by embodiments of the present disclosure. The communication system 10 may include, but is not limited to, a network side device and a terminal device. The number and form of the devices shown in FIG. 1 are for example only and do not constitute a limitation of the embodiments of the present disclosure. The communication system may include two or more network side devices, and two or more terminal devices in practical applications. The communication system 10 shown in FIG. 1 is illustrated as an example by including one network side device 101 and one terminal device 102.

It should be noted that the technical solutions of the embodiments of the present disclosure may be applied to various communication systems. For example, a long term evolution (LTE) system, a 5th generation (5G) mobile communication system, a 5G new radio (NR) system, or other future new mobile communication systems. It is also noted that the side links in the embodiments of the present disclosure may also be referred to as direct links.

A network side device 101 in embodiments of the present disclosure is an entity on the network side for transmitting or receiving signals. For example, the network side device 101 may be an evolved NodeB (eNB), a transmission reception point (TRP), a next generation NodeB (gNB) in an NR system, a base station in other future mobile communication systems, or an access node in the wireless fidelity (WiFi) systems, etc. The embodiments of the present disclosure do not limit the specific technologies and specific device forms used in the network side device. The network side device provided in the embodiments of the present disclosure may be composed of a centralized unit (CU) and a distributed unit (DU), wherein the CU may also be called a control unit, and the CU-DU structure may be used to separate the protocol layers of the network side device, such as a base station, and functions of part of the protocol layers are placed in the CU for centralized control, and functions of the remaining part or all of the protocol layers are distributed in the DU, and the DU is centrally controlled by the CU.

The terminal device 102 in embodiments of the present disclosure is an entity on the user side for receiving or transmitting signals, such as a cell phone. The terminal device may also be referred to as a terminal, user equipment (UE), mobile station (MS), mobile terminal (MT), and the like. The terminal device can be automobiles with communication functions, intelligent cars, mobile phones, wearable devices, tablet computers (Pad), computers with wireless transceiver functions, virtual reality (VR) terminals, augmented reality (AR) terminals, wireless terminals in industrial control, wireless terminals in self-driving, wireless terminals in remote medical surgery, wireless terminals in smart grid, wireless terminals in transportation safety, and wireless terminals in smart city, wireless terminal in smart home, and so on. The embodiments of the present disclosure do not limit the specific technologies and specific device forms used by the terminal devices.

It may be understood that the communication system described in the embodiments of the present disclosure is intended to more clearly illustrate the technical solutions of the embodiments of the present disclosure and does not constitute a limitation of the technical solutions provided in the embodiments of the present disclosure, and ordinary technicians in the field may know that, with the evolution of the system architecture and the emergence of new business scenarios, the technical solutions provided in the embodiments of the present disclosure are also applicable to similar technical problems.

The signal detection methods and apparatuses provided in the present disclosure are described in detail below in conjunction with the accompanying drawings.

The large-scale millimeter wave MIMO has a larger number of transceiver antennas compared with conventional MIMO technology, which brings performance advantages, but at the same time, the complexity of signal detection also increases.

In related techniques, a linear detection algorithm, such as minimum mean square error MMSE is used. MMSE is one of the widely used classical detection methods.

In millimeter-wave MIMO systems, due to the complex channel environment, high channel estimation error, and a large number of nonlinear factors, the performance of signal detection using MMSE is often more than 3 dB worse compared with Maximum Likelihood (ML) detection. The MIMO detection requires high-order matrix inversion and high complexity computation, there is still significant space for improvement in the performance of signal detection.

Based on this, a signal detection method is provided in embodiments of the present disclosure, to reduce the network computational complexity of signal detection.

Figure 2:
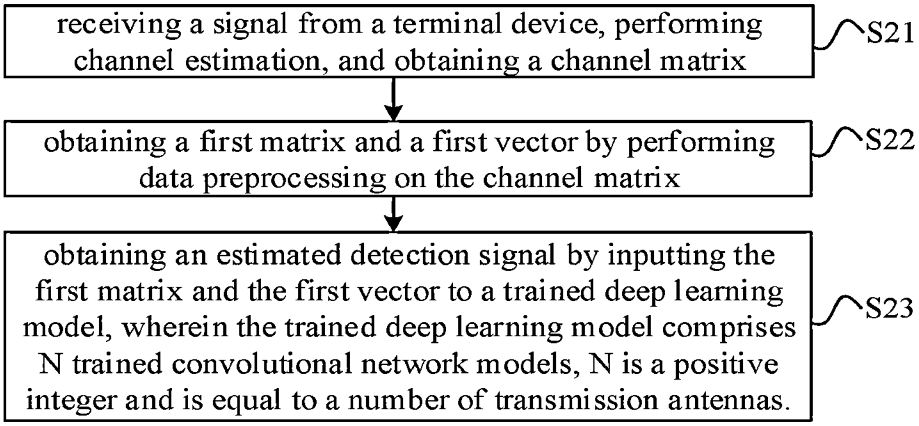
FIG. 2 is a flowchart of a signal detection method provided by embodiments of the present disclosure.

Referring to FIG. 2, FIG. 2 is a flowchart of a signal detection method provided in embodiments of the present disclosure.

As shown in FIG. 2, the method is performed by a network side device, and the method may include, but is not limited to, the following steps.

S21: a signal from a terminal device is received, channel estimation is performed, and a channel matrix is obtained.

It may be understood that, in a MIMO system, the information symbol stream of the terminal device is separated into $N_t$ parallel sub-streams, and after modulation, they are transmitted simultaneously through $N_t$ transmission antennas to maximize the transmission rate. At the network side device, $N_r$ receiving antennas receive the signal which is input to the MIMO detector for detection, under the independent quasi-static Rayleigh flat fading channel condition, the signal model of the MIMO system can be expressed as:

$$y = Hx + n \tag{1}$$

where $x=[x_1, x_2, \ldots, x_{Nt}]^T$ denotes the $N_t$-dimensional transmission vector, and $y=[y_1, y_2, \ldots, y_{Nr}]^T$ denotes the $N_r$-dimensional receiving vector, H denotes the $N_t \times N_r$-dimensional channel matrix, and $n=[n_1, n_2, \ldots, n_{Nr}]^T$ denotes the $N_r$-dimensional additive white Gaussian noise vector.

Due to the MIMO channel matrix, the signal received at the receiver end is a mix of signals sent by different transmission antennas. Therefore, the role of the MIMO detector is to separate the mixed transmission signals and recover the transmission vector x, knowing the receiving signal vector y and the MIMO channel matrix H.

In an embodiment of the present disclosure, the signal from the terminal device is received, channel estimation is performed, and the channel matrix H is obtained.

S22, data preprocessing is performed on the channel matrix, to obtain a first matrix and a first vector.

In some embodiments, the data preprocessing on the channel matrix H is QR decomposition on the channel matrix H:

$$H = QR = Q\begin{bmatrix} R_{Nt\times Nt} \\ 0_{(Nr-Nt)\times Nt} \end{bmatrix} = [Q_1\ Q_2]\begin{bmatrix} R \\ 0 \end{bmatrix} \tag{2}$$

In an embodiment of the present disclosure, QR decomposition is performed on the channel matrix H, to obtain a first matrix R and a second matrix Q. Afterwards, according to the first matrix R and the second matrix Q, the expression of $\|y-Hx\|^2$ satisfies the following relation:

$$\|y - Hx\|^2 = \left\| y - [Q_1\ Q_2]\begin{bmatrix} R \\ 0 \end{bmatrix} \times \right\|^2 = \left\| \begin{bmatrix} Q_1^* \\ Q_2^* \end{bmatrix} y - \begin{bmatrix} R \\ 0 \end{bmatrix} \times \right\|^2 = \|Q_1^{\wedge} y - Rx\|^2 + \|Q_2^{\wedge} y\|^2 \tag{3}$$

Further, the first vector z is obtained.

The expression of the first vector z satisfies the following relation:

$$z = Q_1^* y \tag{4}$$

S23, the first matrix and the first vector are input to a trained deep learning model, to obtain an estimated detection signal, wherein the trained deep learning model includes N trained convolutional network models, N is a positive integer and is equal to a number of transmission antennas.

In this embodiment of the present disclosure, the first matrix R and the first vector z are input to the trained deep learning model after the first matrix R and the first vector z are obtained by the above calculation, to obtain the estimated detection signal.

In an embodiment of the present disclosure, the trained deep learning model includes N trained convolutional network models, wherein N is a positive integer and equal to the number of transmission antennas $N_t$. According to the first matrix R and the first vector z, for the tree search detection algorithm, the trained deep learning model is used instead of the K-best detection algorithm for the optimal path selection, and maximum likelihood detection is carried out, to obtain the optimal path and retain the path nodes, and further stage estimation of the detection signal is performed, which can reduce the computational complexity.

By implementing the embodiment of the present disclosure, a signal from a terminal device is received, channel estimation is performed, and a channel matrix is obtained; a first matrix and a first vector are obtained by performing data preprocessing on the channel matrix; and an estimated detection signal is obtained by inputting the first matrix and the first vector to a trained deep learning model, wherein the trained deep learning model includes N trained convolutional network models, N is a positive integer and is equal to a number of transmission antennas. Therefore, the complexity of signal detection can be reduced.

Figure 3:
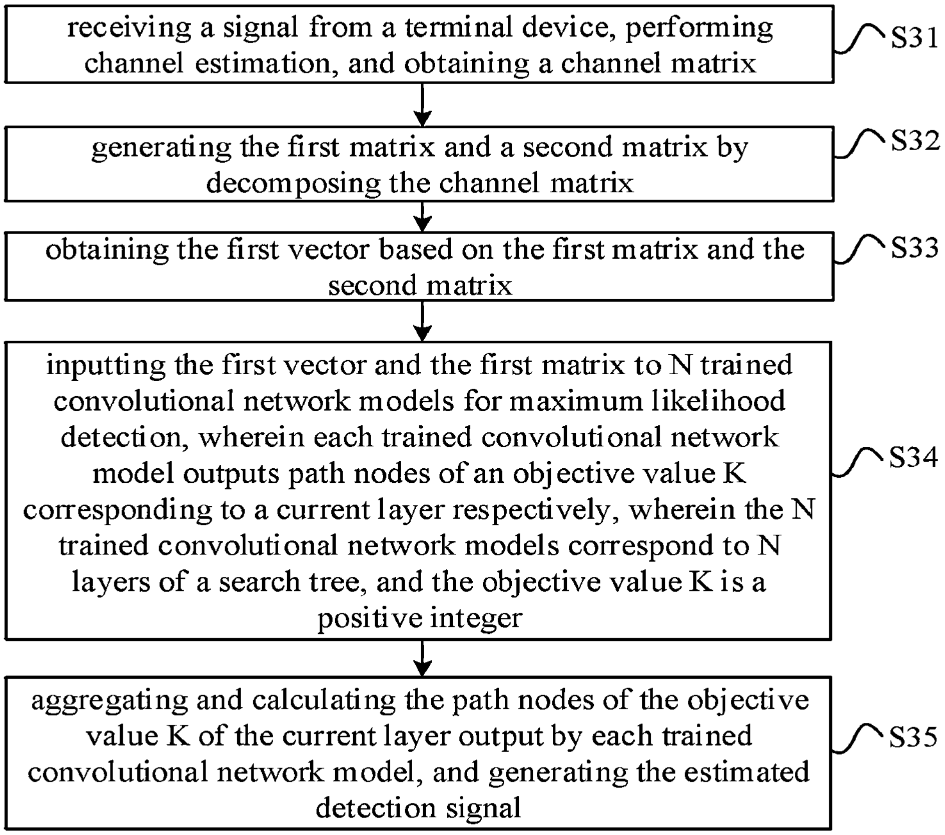
FIG. 3 is a flowchart of another signal detection method provided by embodiments of the present disclosure.

Referring to FIG. 3, FIG. 3 is a flowchart of a signal detection method provided by embodiments of the present disclosure.

As shown in FIG. 3, the method is performed by a network side device, and the method may include, but is not limited to, the following steps.

S31, a signal from a terminal device is received, channel estimation is performed, and a channel matrix is obtained.

S32, the channel matrix is decomposed to generate a first matrix and a second matrix.

S33, a first vector is obtained according to the first matrix and the second matrix.

The descriptive illustrations of S31 to S33 in the embodiments of the present disclosure can be found in the descriptions in S21 to S22 in the above embodiments, and will not be repeated herein.

S34, the first vector and the first matrix are input to N trained convolutional network models for maximum likelihood detection, wherein each trained convolutional network model outputs path nodes of an objective value K corresponding to a current layer respectively, wherein the N trained convolutional network models correspond to N layers of a search tree, and the objective value K is a positive integer.

In an embodiment of the present disclosure, the first vector $z=Q_1{}^*y$ and the first matrix R are used as inputs to the trained deep learning model, and the expression of maximum likelihood detection satisfies the following relationship:

$$\hat{x}_i = \arg\min_{x\in\Omega}\|y-Hx\|^2 = \arg\min_{x\in\Omega}\|z-Rx\|^2 = \sum_{i=1}^{m}\left(z_i - \sum_{j=1}^{m} R_{ij}x_j\right) \tag{5}$$

It can be seen that the maximum likelihood detection problem can be transformed into a minimum path search problem for a weighted tree, where the jth element of the transmission vector x corresponds to the jth layer of the tree, and each node in the jth layer can be uniquely determined by a path from the root node to that node.

In embodiments of the present disclosure, each trained convolutional network model corresponds to a layer of the search tree, which correspondingly outputs path nodes $\hat{x}_i$ of an objective value K of the current layer. Each trained convolutional network model for path selection includes a number of composite convolutional layers. The first vector z and the first matrix R are used as inputs, the input dimension is $N_t \times N_t$, a convolutional layer with a convolutional kernel size of m×m and the number of l is used, the ReLU activation function is used, and the dimension of the output layer is the objective value K, where $N_t$, m, l, and K are all positive integers.

S35, the path nodes of the objective value K of the current layer output by each trained convolutional network model are aggregated and calculated, and the estimated detection signal is generated.

Each element j of the transmission vector x is assigned the expression of the path metric PD satisfying the following relation:

$$PD(x_j) = PD[x_{j+1}) + \sigma(x_j) \tag{6}$$

where $$\sigma(x_j) = \left\|z_j - \sum_{i=j}^{Nt} R_{j,i}x_i\right\|,$$

and at the root node, when $j=N_t$.

It can be seen that from the root node to a leaf node along any path, the path metric is non-decreasing, and maximum likelihood detection can be equated to searching the leaf node with the smallest metric in the tree.

Based on this, in embodiments of the present disclosure, the path nodes $\hat{x}_i$ of the objective value K of the current layer output by each trained convolutional network model are aggregated and calculated, and the estimated detection signal is generated. As a result, the signals are detected and the estimated detection signals are generated, which reduces computational complexity under the condition of approaching the performance of maximum likelihood detection.

Figure 4:
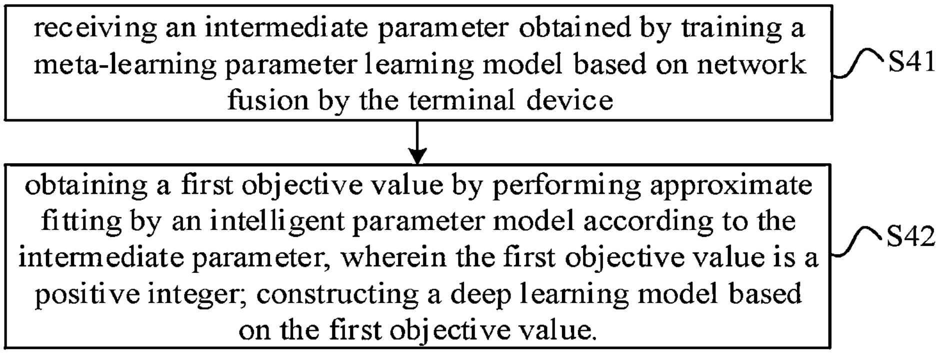
FIG. 4 is a flowchart of yet another signal detection method provided by embodiments of the present disclosure.

Referring to FIG. 4, FIG. 4 is a flowchart of a signal detection method provided by embodiments of the present disclosure.

As shown in FIG. 4, the method is performed by a network side device, and the method may include, but is not limited to, the following steps.

S41, an intermediate parameter obtained by training a meta-learning parameter learning model based on network fusion by the terminal device is received.

In embodiments of the present disclosure, the intermediate parameter is sent to the network-side device after the intermediate parameter is obtained by training the meta-learning parameter learning model based on network fusion by the terminal device, the parameter of the learning objective value K is initialized by the number of transmission antennas and the number of modulation order, and the intermediate parameter is obtained by training the meta-learning parameter model based on network fusion.

The meta-learning method has better parameter training effect and faster convergence speed. In embodiments of the present disclosure, a variety of well-performing meta-learning networks are used, and the method of network fusion is applied to fuse the learning results of the meta-learning network model, so as to be able to obtain better performance and a stronger network generalization capability.

S42, a first objective value is obtained by performing approximate fitting by an intelligent parameter model according to the intermediate parameter, wherein the first objective value is a positive integer; a deep learning model is constructed based on the first objective value.

In order to achieve that the K-best detection in the tree search algorithm approaches the performance of ML, the first objective value needs to reach a certain value, and the deep learning model also sets the first objective value. For the value of K that can obtain the optimal path, the requirement of the upper-layer node is apparently smaller than that of the lower-layer node, so the fixed first objective value of each layer of the K-best algorithm is cancelled, and the value of the first objective value is designed as a fitting function according to the changing law, which satisfies the following relationship:

$$k = a * k^b + c \tag{7}$$

where a, b, and c are learnable parameters, and the first objective value k is the number of layer of the path node.

In the present disclosure embodiment, the intelligent parameter model performs approximate fitting to obtain the first objective value, a suitable approximate fitting function is designed for the varying first objective value k. The intelligent parameter model is deployed in the network-side device, after which the obtained positive integer first objective value is fed back to the deep learning model, which participates in the construction of the deep model, which increases the performance of the detection network while obtaining a lower computational complexity.

It should be noted that S51 and S52 in the present disclosure embodiments may be implemented separately or in combination with any of the other steps in embodiments of the present disclosure, such as in combination with S31 to S33 and/or S41 to S44 in embodiments of the present disclosure, and the present disclosure embodiments do not limit this.

Figure 5:
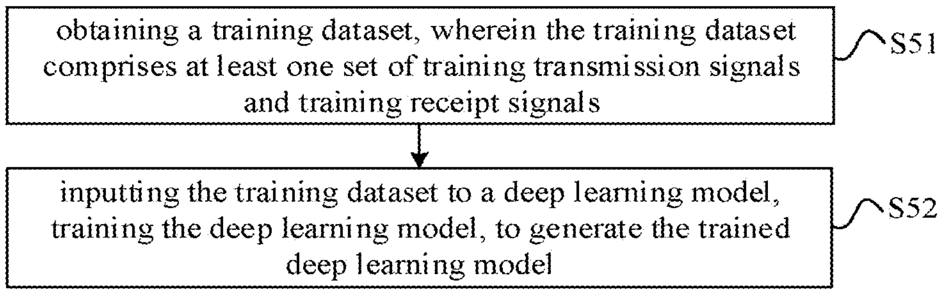
FIG. 5 is a flowchart of yet another signal detection method provided by embodiments of the present disclosure.

Referring to FIG. 5, FIG. 5 is a flowchart of a signal detection method provided by embodiments of the present disclosure.

As shown in FIG. 5, the method is performed by a network-side device, and the method may include, but is not limited to, the following steps.

S51, a training dataset is obtained, wherein the training dataset includes at least one set of training transmission signals and training receipt signals.

In an embodiment of the present disclosure, according to the channel matrix H obtained from the channel estimation, at least one set of training transmission signals and training receipt signals is simulated and generated, to obtain a training data set.

S52, the training dataset is input to a deep learning model, the deep learning model is trained, to generate the trained deep learning model.

In some embodiments, the training transmission signals are input to the deep learning model to obtain the prediction signals; based on the prediction signals and the training receipt signals, the deep learning model is updated to generate the trained deep learning model.

In embodiments of the present disclosure, in addition to simulating and generating at least one set of training transmission signals and training receipt signals according to the channel matrix H obtained from the channel estimation to obtain a training data set, a validation dataset and a test dataset are also included. It can be understood that, the validation dataset includes at least one set of validation transmission signals and validation receipt signals, and the test dataset includes at least one set of test transmission signals and test receipt signals.

After training the deep learning model on the training data set to obtain the trained deep learning model, the validation data set is used to validate the trained deep learning model, to verify a signal detection effect of the trained deep learning model, and further, the testing data set is used to test the trained deep learning model, to test whether the signal detection effect of the trained deep learning model achieves a desired effect.

In some embodiments, the trained deep learning model includes an objective value K, the method further includes:

updating the first objective value during a process of updating the deep learning model, to obtain the objective value K.

In embodiments of the present disclosure, as for an intermediate parameter obtained by training a meta-learning parameter learning model based on network fusion by the terminal device, an intelligent parameter model performs approximate fitting, to obtain a first objective value, which is involved in the construction of the deep learning model, after which the first objective value is jointly trained in the process of training the deep learning model, to obtain the objective value K, so as to enable the deep learning model to learn the global optimum.

In embodiments of the present disclosure, after training the deep learning model, the trained deep learning model including the objective value K is deployed at the network device.

Figure 6:
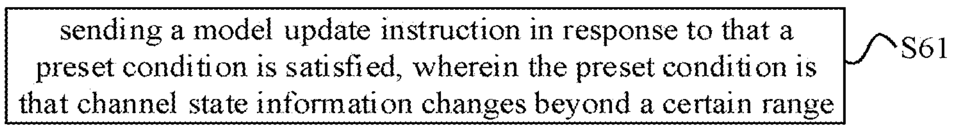
FIG. 6 is a flowchart of yet another signal detection method provided by embodiments of the present disclosure.

Referring to FIG. 6, FIG. 6 is a flowchart of a signal detection method provided by embodiments of the present disclosure.

As shown in FIG. 6, the method is performed by a network-side device, and the method may include, but is not limited to, the following steps.

S61, a model update instruction is sent in response to that a preset condition is satisfied, wherein the preset condition is that channel state information changes beyond a certain range.

It can be understood that, the deep learning model may experience severe delay in collecting sufficient training data online, especially in the low signal-to-noise ratio state, which brings difficulties in training and deploying the deep learning model.

In embodiments of the present disclosure, in response to that a preset condition is satisfied, it may be that when the network-side device detects a change in channel state information, the performance of the trained deep learning model in the current channel environment is evaluated, and a model update instruction is sent to the terminal device when the performance is significantly reduced.

In embodiments of the present disclosure, in order to cope with the complex and changeable channel environment, a network online update process is designed to send a model update instruction to the terminal device when a preset condition is met and the trained deep learning model needs to be updated, thereby fully utilizing the advantages of meta-learning in obtaining training data and rapid updating, and obtaining the updated intermediate parameter by training a meta-learning parameter learning model based on network fusion at the terminal device.

In some embodiments, the network-side device receives an updated intermediate parameter obtained by training a meta-learning parameter learning model based on network fusion by the terminal device; a second objective value is obtained by performing approximate fitting by an intelligent parameter model according to the updated intermediate parameter, wherein the second objective value is a positive integer; a to-be-updated deep learning model is constructed based on the second objective value.

In some embodiments, an updated training dataset is obtained, wherein the updated training dataset includes at least one set of updated training transmission signals and updated training receipt signals; the updated training dataset is input to the to-be-updated deep learning model, the to-be-updated deep learning model is trained to generate a updated trained deep learning model.

In an embodiment of the present disclosure, in the process of updating the trained deep learning model, the to-be-updated deep learning model is constructed based on the second objective value, after which a updated training data set is obtained, wherein the updated training dataset includes at least one set of updated training transmission signals and updated training receipt signals; the updated training dataset is input to the to-be-updated deep learning model, the to-be-updated deep learning model is trained, the manner of generating a updated trained deep learning model is similar to the process of constructing the deep learning model and training the deep learning model, which can be seen in the relevant description of the above embodiments, and will not be repeated herein.

Figure 7:
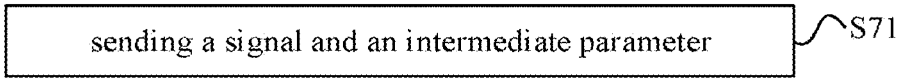
FIG. 7 is a flowchart of yet another signal detection method provided by embodiments of the present disclosure.

Referring to FIG. 7, FIG. 7 is a flowchart of a signal detection method provided by embodiments of the present disclosure.

As shown in FIG. 7, the method is executed by a terminal device, and the method may include, but is not limited to, the following steps.

S71, a signal and an intermediate parameter are sent, wherein the intermediate parameter is obtained by training a meta-learning parameter learning model based on network fusion.

In embodiments of the present disclosure, in a MIMO system, in order to obtain the maximum transmission rate, the information symbol stream of the terminal device is separated into $N_t$ parallel sub-streams, and after modulation, they are transmitted simultaneously through $N_t$ transmission antennas, and the terminal device transmits the signal.

In embodiments of the present disclosure, the terminal device is deployed with a meta-learning parameter learning model of network fusion, and the meta-learning method is capable of rapidly learning new tasks based on acquiring existing "knowledge", with the intention of designing a network model capable of rapidly learning or adapting to new environment through a small number of training instances, and having the ability to learn how to learn.

In some embodiments, at least one first parameter is initialized based on the number of transmission antennas and the modulation order, and the first parameter is input to a meta-learning parameter learning model of network fusion, and training is performed to obtain an intermediate parameter, and the intermediate parameter is sent to the network side device.

In embodiments of the present disclosure, the at least one first parameter is initialized according to the number of transmission antennas and the number of modulation orders. For example, the parameter a, parameter b, and parameter c are initialized. The parameter a, parameter b, and parameter c are learnable parameters.

The expression that combines the learnable parameters a, b, c as the input X of the meta-learning parameter learning model of network fusion satisfies the following relation:

$$X = (a, b, c) \tag{8}$$

In some embodiments, the meta-learning parameter learning model of network fusion in embodiments of the present disclosure includes a prediction gradient based meta-learning model, an LSTM-based (Long Short-Term Memory) meta-learning model, and a network fusion model.

In some embodiments, the first parameter is input to a prediction gradient based meta-learning model, to generate a first intermediate parameter. The first parameter is input to an LSTM-based meta-learning model, to generate a second intermediate parameter. The first intermediate value and the second intermediate value are input to a network fusion model, to generate the intermediate parameter.

Figure 8:
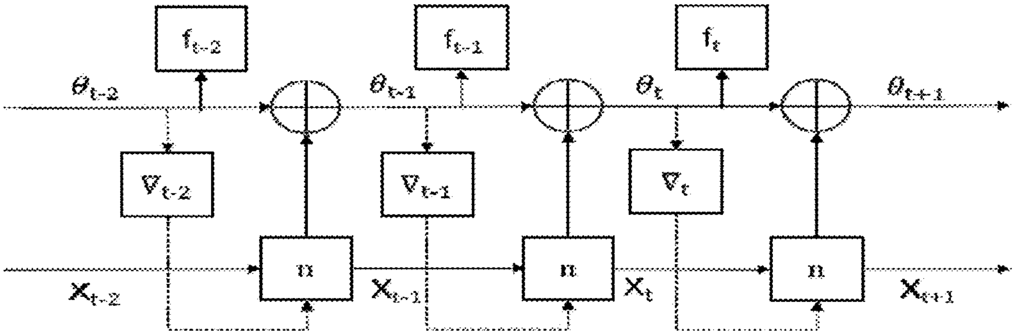
FIG. 8 is a structural diagram of a prediction gradient based meta-learning model provided by embodiments of the present disclosure.

The structure of the prediction gradient based meta-learning model is shown in FIG. 8. In the embodiment, θ is the propagated meta-learning network state information, and V is the propagated prediction gradient information.

In embodiments of the present disclosure, the prediction gradient based meta-learning model predicts the gradient by training a generalized neural network, which is trained by a regression problem with a quadratic equation, so that the gradient of the obtained neural network optimizer drops faster and more accurately, thus realizing fast learning.

Figure 9:
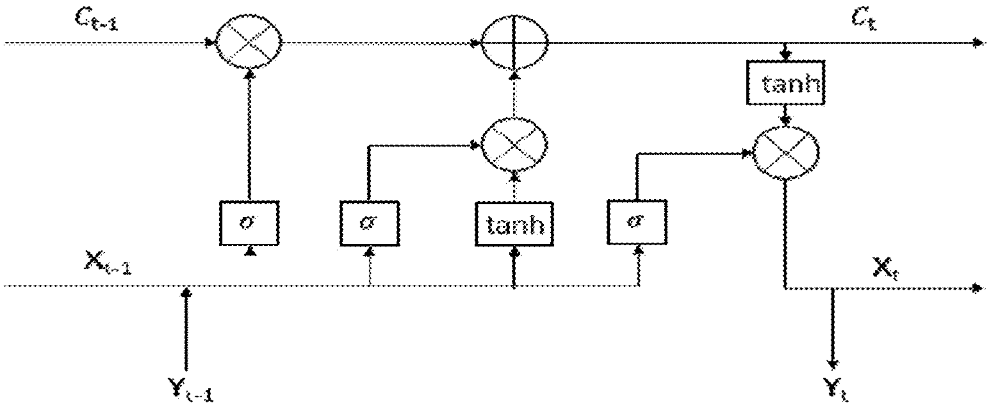
FIG. 9 is a structural diagram of an LSTM-based (Long Short-Term Memory) meta-learning model provided by embodiments of the present disclosure.

In this embodiment, the structure of the LSTM-based meta-learning model is shown in FIG. 9. LSTM is a special kind of recurrent neural network, which removes or adds information from or to the cellular state C through a gate structure. The learnable parameter X is trained by the LSTM network, and the current learnable parameter is input, to directly output the new updated result.

In the embodiments of the present disclosure, the prediction gradient based meta-learning model and the LSTM-based meta-learning model both exhibit good performance, and the network fusion model is designed to fuse the learning results of meta-learning networks with different structures, so as to be able to achieve a better result than multiple finely tuned models. The expression of network fusion model satisfies the following relationship:

$$Y = W_1 Y_1 + W_2 Y_2 \tag{9}$$

$Y_1$ is the output result of parameter learning based on the prediction gradient based meta-learning model, $Y_2$ is the output result of parameter learning based on the LSTM-based meta-learning model, and $W_1$ and $W_2$ are learnable scalars, $W_1$ and $W_2$ can be learned through the network.

In embodiments of the present disclosure, the use of the network fusion learning method through the network fusion model enhances the network generalization capability while improving the performance of the network, and enhances the ability to cope with channel change.

Figure 10:
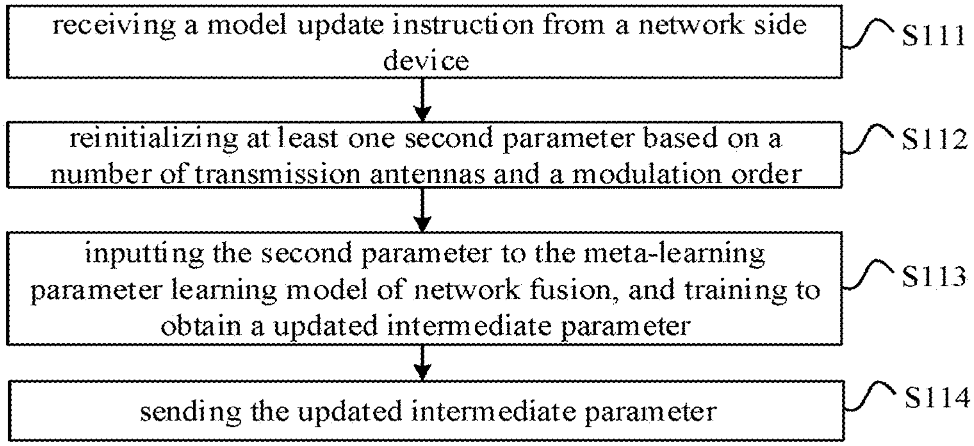
FIG. 10 is a flowchart of yet another signal detection method provided by embodiments of the present disclosure.

Referring to FIG. 10, FIG. 10 is a flowchart of a signal detection method provided by embodiments of the present disclosure.

As shown in FIG. 10, the method is performed by a terminal device, and the method may include, but is not limited to, the following steps:

S101, receiving a model update instruction from a network side device;

S102, reinitializing at least one second parameter based on a number of transmission antennas and a modulation order;

S103, inputting the second parameter to the meta-learning parameter learning model of network fusion, and training to obtain an updated intermediate parameter;

S104, sending the updated intermediate parameter.

In the embodiment of the present disclosure, the terminal device receives a model update instruction sent from a network side device, reinitializes at least one second parameter, and then inputs the second parameter to the meta-learning parameter learning model of network fusion, and trains to obtain an updated intermediate parameter, which is similar to the process of initializing at least one first parameter based on the number of transmission antennas and the modulation order, inputting the first parameter to a meta-learning parameter learning model of network fusion, and training to obtain an intermediate parameter, and sending the intermediate parameter in the above embodiment, which can refer to the relevant description of the above embodiments and will not be repeated herein.

In the embodiments of the present disclosure, when the trained deep learning model is updated, a model update instruction is sent to the terminal device, and at the terminal device side, at least one second parameter is reinitialized according to the number of transmission antennas and the number of modulation orders, and the meta-learning parameter learning model of network fusion is utilized for re-training to obtain the updated intermediate parameter, which can use the previous knowledge and experience to guide learning of new tasks while exerting the meta-learning method, and quickly update the deep learning model through a small number of training instances.

In the above embodiments provided in the present disclosure, the methods provided in the embodiments of the present disclosure are described from the perspectives of the network-side device and the terminal device, respectively. In order to implement each of the functions in the method provided by the above embodiments of the present disclosure, the network-side device and the terminal device may include a hardware structure, a software module, and implement each of the above functions in the form of a hardware structure, a software module, or a hardware structure in combination with a software module. A function of each of the above-described functions may be performed in the form of a hardware structure, a software module, or a hardware structure in combination with a software module.

Figure 11:
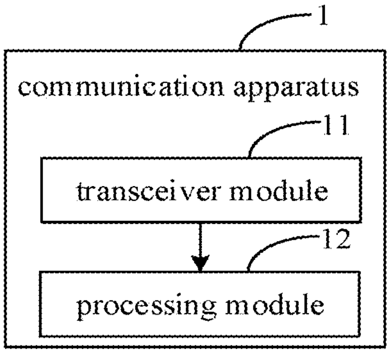
FIG. 11 is a structural diagram of a communication apparatus provided by embodiments of the present disclosure.

Referring to FIG. 11, a schematic diagram of a structure of a communication apparatus 1 provided by embodiments of the present disclosure is shown. The communication apparatus 1 shown in FIG. 11 may include a transceiver module 11 and a processing module 12. The transceiver module 11 may include a transmitting module and/or a receiving module. The transmitting module is used to implement a transmitting function, and the receiving module is used to implement a receiving function. The transceiver module 11 may implement the transmitting function and/or the receiving function.

The communication apparatus 1 may be a network-side device, an apparatus in a network-side device, or an apparatus capable of being matched for use with a network-side device. Alternatively, the communication apparatus 1 may be a terminal device, or an apparatus in a terminal device, or an apparatus capable of being matched for use with a terminal device.

The communication apparatus 1 is a network-side device, the transceiver module 11 is configured to receive a signal from a terminal device;

the processing module 12 is configured to perform channel estimation, and obtain a channel matrix; obtain a first matrix and a first vector by performing data preprocessing on the channel matrix; and obtain an estimated detection signal by inputting the first matrix and the first vector to a trained deep learning model, wherein the trained deep learning model includes N trained convolutional network models, N is a positive integer and is equal to a number of transmission antennas.

The communication apparatus 1 is a terminal device, the transceiver module 11 is configured to send a signal and an intermediate parameter, wherein the intermediate parameter is obtained by training a meta-learning parameter learning model based on network fusion.

Figure 12:
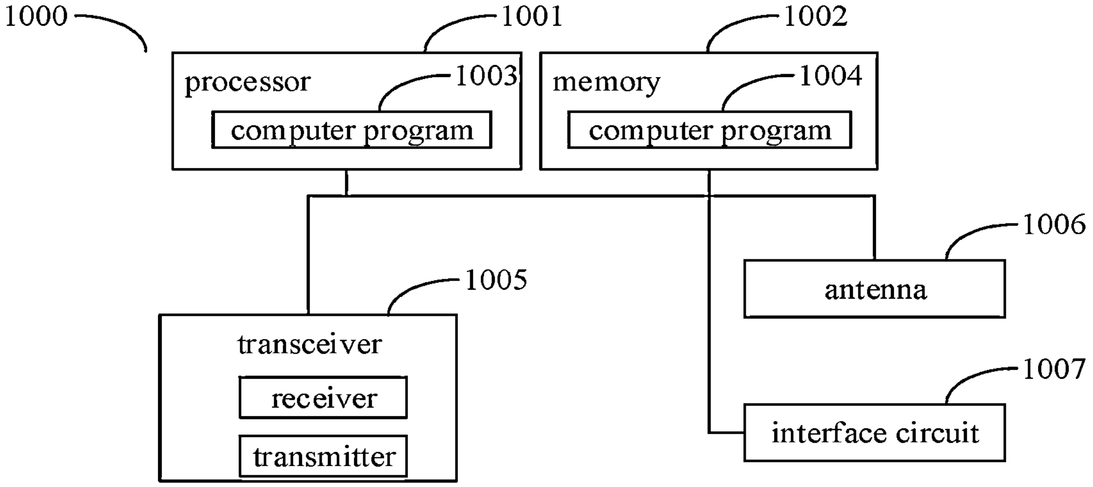
FIG. 12 is a structural diagram of another communication apparatus provided by embodiments of the present disclosure.

Referring to FIG. 12, FIG. 12 is a schematic diagram of a structure of another communication apparatus 1000 provided by embodiments of the present disclosure. The communication apparatus 1000 may be a network-side device or a terminal device, or may be a chip, chip system, or processor, etc. that enables the network-side device to implement the above-described method, or may be a chip, chip system, or processor, etc. that enables the terminal device to implement the above-described methods. The communication apparatus 1000 may be used to implement the methods described in the above-described method embodiments, which may refer to the above-described method embodiments.

The communication apparatus 1000 may be a network-side device, or a terminal device, or a chip, chip system, or processor, etc. that enables the network-side device to implement the above-described method, or a chip, chip system, or processor, etc. that enables the terminal device to implement the above-described methods. The apparatus may be used to implement the methods described in the above-described method embodiments, which may refer to the above-described method embodiments.

The communication apparatus 1000 may include one or more processors 1001. The processor 1001 may be a general-purpose processor or a specialized processor, and the like. For example, the processor 1001 may be a baseband processor or a central processor. The baseband processor may be used to process communication protocols as well as communication data, and the central processor may be used to control a communication apparatus (e.g., a base station, baseband chip, terminal device, terminal device chip, DU or CU, etc.), execute a computer program, and process data of the computer program.

Optionally, the communication apparatus 1000 may further include one or more memories 1002 on which a computer program 1004 may be stored, and the memory 1002 executes the computer program 1004 to cause the communication apparatus 1000 to perform the methods described in the above method embodiments. Optionally, data may also be stored in the memory 1002. The communication apparatus 1000 and the memory 1002 may be provided separately or may be integrated together.

Optionally, the communication apparatus 1000 may further include a transceiver 1005, and an antenna 1006. The transceiver 1005 may be referred to as a transceiver unit, a transceiver machine, or a transceiver circuit, etc., and is used to implement the transceiver function. The transceiver 1005 may include a receiver and a transmitter, and the receiver may be referred to as a receiver machine or a receiving circuit, etc., for implementing the receiving function, and the transmitter may be referred to as a transmitter machine or a transmitting circuit, etc., for implementing the transmitting function.

Optionally, one or more interface circuits 1007 may also be included in the communication apparatus 1000. The interface circuits 1007 are used for receiving code instructions and transmitting them to the processor 1001. The processor 1001 runs the code instructions to cause the communication apparatus 1000 to perform the methods described in the above method embodiments.

The communication apparatus 1000 is a network side device. The transceiver 1005 is used to execute S21 in FIG.

2; S31 in FIG. 3; S41 in FIG. 4; S51 in FIG. 5; and S61 in FIG. 6. The processor 1001 is used to execute S22, S23 in FIG. 2; S32, S33, S34, S35 in FIG. 3; S42 in FIG. 4; and S52 in FIG. 5.

The communication apparatus 1000 is a terminal device. The transceiver 1005 is used to perform S71 in FIG. 7; S101 in FIG. 10; and the processor 1001 is used to perform S102, S103, S104 in FIG. 10.

In one implementation, the processor 1001 may include a transceiver for implementing the receiving and transmitting functions. The transceiver may be for example a transceiver circuit, or an interface, or an interface circuit. The transceiver circuit, interface, or interface circuit for implementing the receiving and transmitting functions may be separate or may be integrated together. The transceiver circuit, interface, or interface circuit described above may be used for code/data reading and writing, or, the transceiver circuit, interface, or interface circuit described above may be used for signal transmission or delivery.

In one implementation, the processor 1001 may store a computer program 1003, which runs on the processor 1001 and may cause the communication apparatus 1000 to perform the methods described in the method embodiments above. The computer program 1003 may be solidified in the processor 1001, and in this case, the processor 1001 may be implemented by hardware.

In one implementation, the communication apparatus 1000 may include a circuit, the circuit may implement the functions of transmitting or receiving or communicating in the preceding method embodiments. The processors and transceivers described in this disclosure may be implemented on integrated circuits (ICs), analog ICs, radio frequency integrated circuits RFICs, mixed signal ICs, application specific integrated circuits (ASICs), Printed circuit boards (PCB), electronic devices, etc. The processor and transceiver can also be manufactured by various IC process technologies, such as complementary metal oxide semiconductor (CMOS), NMET-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication apparatus in the description of above embodiments may be a terminal device, but the scope of the communication apparatus described in the present disclosure is not limited thereto, and the structure of the communication apparatus may not be limited by FIG. 12. The communication apparatus may be a stand-alone device or may be part of a larger device. For example the described communication apparatus may be:

(1) a stand-alone integrated circuit IC, or chip, or, chip system or subsystem;
(2) a collection having one or more ICs, optionally, the collection of ICs may also include storage components for storing data, computer programs;
(3) an ASIC, such as a Modem;
(4) modules that can be embedded within other devices;
(5) receivers, terminal devices, smart terminal devices, cellular phones, wireless devices, handhelds, mobile units, in-vehicle devices, network devices, cloud devices, artificial intelligence devices, and the like;
(6) others, etc.

Figure 13:
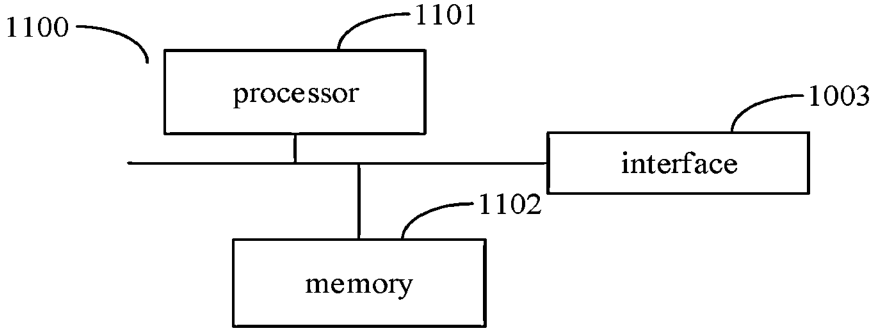
FIG. 13 is a structural diagram of a chip provided by embodiments of the present disclosure.

For the case where the communication apparatus may be a chip or a chip system, please refer to FIG. 13, which is a structural diagram of a chip provided in embodiments of the present disclosure.

The chip 1100 includes a processor 1101 and an interface 1103. The number of processors 1101 may be one or more, and the number of interfaces 1103 may be more than one.

For the case where the chip is used to implement a function of a network side device in an embodiment of the present disclosure:

the interface 1103 is used for receiving code instructions and transmitting them to the processor.

The processor 1101 is used for running code instructions to perform a signal detection method as described in some of the above embodiments.

For the case where the chip is used to implement the function of the terminal device in the embodiments of the present disclosure:

the interface 1103 is used for receiving code instructions and transmitting them to the processor.

The processor 1101 is used for running the code instructions to perform the signal detection method as described in some embodiments above.

Optionally, the chip 1100 further includes a memory 1102, the memory 1102 is used for storing necessary computer programs and data.

Those skilled in the art may also appreciate that various illustrative logical blocks and steps listed in the embodiments of the present disclosure may be implemented by electronic hardware, computer software, or a combination of both. Whether such function is implemented by hardware or software depends on the particular application and the design requirements of the overall system. A person skilled in the art, for each particular application, may use a variety of methods to implement the described function, but such implementations should not be construed as being going beyond the scope of protection of embodiments of the present disclosure.

Embodiments of the present disclosure also provide a signal detection system. The system includes a communication apparatus as a network-side device and a communication apparatus as a terminal device in the aforementioned embodiment of FIG. 11, or, alternatively, the system includes a communication apparatus as a network-side device and a communication apparatus as a terminal device in the aforementioned embodiment of FIG. 12.

The present disclosure also provides a non-transitory readable storage medium having stored thereon instructions which, when executed by a computer, implement the functions of any of the foregoing method embodiments.

The present disclosure also provides a computer program product which implements the function of any of the above-described method embodiments when executed by a computer.

In the above embodiments, this may be implemented in whole or in part by software, hardware, firmware, or any combination thereof. When implemented using software, it may be implemented in whole or in part in the form of a computer program product. The computer program product includes one or more computer programs. Loading and executing the computer program on a computer produces, in whole or in part, a process or function in accordance with embodiments of the present disclosure. The computer may be a general purpose computer, a specialized computer, a computer network, or other programmable devices. The computer program may be stored in a computer-readable storage medium or transmitted from one computer-readable storage medium to another computer-readable storage medium. For example, the computer program may be transmitted from a web site, computer, server, or data center via a wired (e.g., coaxial cable, fiber optic, digital subscriber line (DSL)) or wireless (e.g., infrared, wireless, microwave, etc.) to another website site, computer, server, or data center. The computer-readable storage medium can be any available medium that a computer can access or a data storage device such as a server, a data center and the like that contains one or more available media integration. The usable medium may be a magnetic medium (e.g., floppy disk, hard disk, magnetic tape), an optical medium (e.g., high-density digital video disc (DVD)), or a semiconductor medium (e.g., solid state disk (SSD)) and the like.

A person of ordinary skill in the art may understand that the first, second, and other various numerical numbers involved in the present disclosure are only for the convenience of description, and are not used to limit the scope of the embodiments of this disclosure, but also indicate the order.

The at least one in the present disclosure may also be described as one or more, and the plurality may be two, three, four, or more, which is not limited by the present disclosure. In embodiments of the present disclosure, for a technical feature, a technical feature is described by "first", "second", "third", "A", "B", "C", and "D", etc., to distinguish the technical features in the kind of technical features, technical features described with the "first", "second", "third", "A", "B", "C", and "D" are not in any order of precedence or magnitude.

The correspondence shown in each table in the present disclosure may be configured or may also be predefined. The values of the information in the tables are merely examples, and may be configured with other values, without limitation of the present disclosure. In configuring the correspondence between the information and the respective parameters, it is not necessarily required that all of the correspondences illustrated in the respective tables must be configured. For example, in tables of the present disclosure, the correspondences illustrated in certain rows may also not be configured. For another example, the above tables may be appropriately adjusted, such as splitting, merging, and the like. The names of the parameters shown in the headings in the above-described tables may also adopt other names understandable by the communication apparatus, and the values or representations of the parameters thereof may also adopt other values or representations understandable by the communication apparatus. The above tables may also be implemented using other data structures, for example, an array, a queue, a container, a stack, a linear table, a pointer, a chained list, a tree, a graph, a structure, a class, a heap, or a hash table may be adopted.

Predefined in the context of the present disclosure may be understood as defined, pre-defined, stored, pre-stored, pre-negotiated, pre-configured, solidified, or pre-fired.

One of ordinary skill in the art may realize that the units and algorithmic steps of various examples described in conjunction with embodiments disclosed herein are capable of being implemented in electronic hardware, or a combination of computer software and electronic hardware. Whether these functions are performed in hardware or software depends on the particular application and design constraints of the technical solution. A person of skill in the art may use different methods to implement the described functions for each particular application, but such implementations should not be considered going beyond the scope of the present disclosure.

It is clear to one of ordinary skill in the art that, for the convenience and brevity of the description, the specific working processes of the above-described systems, apparatuses, and units can be referred to the corresponding processes in the foregoing embodiments of the methods, which will not be repeated herein.

The above description is only a specific embodiment of the present disclosure, but the scope of protection of the present disclosure is not limited thereto, and any changes or substitutions that can be readily thought of by any person skilled in the art within the scope of the technology disclosed in the present disclosure shall be covered within the scope of protection of the present disclosure. Therefore, the scope of protection of the present disclosure shall be subject to the scope of protection of the appended claims.

What is claimed is:

1. A method of signal detection, the method being performed by a network side device and comprising:

obtaining a channel matrix by performing channel estimation on a signal received from a terminal device;

obtaining a first matrix and a first vector by performing data preprocessing on the channel matrix; and obtaining an estimated detection signal by inputting the first matrix and the first vector to a trained deep learning model, wherein the trained deep learning model comprises N trained convolutional network models, N being a positive integer and being equal to a number of transmission antennas.

2. The method according to claim 1, wherein obtaining the first matrix and the first vector by performing the data preprocessing on the channel matrix comprises:

generating the first matrix and a second matrix by decomposing the channel matrix; and obtaining the first vector based on the first matrix and the second matrix.

3. The method according to claim 1, wherein generating the estimated detection signal by inputting the first matrix and the first vector to the trained deep learning model comprises:

inputting the first vector and the first matrix to the N trained convolutional network models for maximum likelihood detection, wherein each trained convolutional network model outputs path nodes of an objective value K corresponding to a current layer respectively, wherein the N trained convolutional network models correspond to N layers of a search tree, and the objective value K is a positive integer; and aggregating and calculating the path nodes of the objective value K of the current layer output by each trained convolutional network model to generate the estimated detection signal.

4. The method according to claim 3, further comprising:

receiving an intermediate parameter obtained by training a meta-learning parameter learning model based on network fusion by the terminal device;

obtaining a first objective value by performing approximate fitting by an intelligent parameter model according to the intermediate parameter, wherein the first objective value is a positive integer; and constructing a deep learning model based on the first objective value.

5. The method according to claim 1, further comprising:

obtaining a training dataset, wherein the training dataset comprises at least one set of training transmission signals and training receipt signals;

inputting the training dataset to a deep learning model;

training the deep learning model to generate the trained deep learning model.

6. The method according to claim 5, wherein inputting the training dataset to the deep learning model and training the deep learning model to generate the trained deep learning model comprises:
- obtaining a prediction signal by inputting the training transmission signals to the deep learning model; and
- updating the deep learning model based on the prediction signal and the training receipt signals, to generate the trained deep learning model.

7. The method according to claim 4, wherein the trained deep learning model comprises the objective value K, the method further comprises:
- updating the first objective value during a process of updating the deep learning model, to obtain the objective value K.

8. The method according to claim 1, further comprising:
- sending a model update instruction in response to that a preset condition is satisfied, wherein the preset condition is that channel state information changes beyond a certain range.

9. The method according to claim 8, further comprising:
- receiving an updated intermediate parameter obtained by training a meta-learning parameter learning model based on network fusion by the terminal device;
- obtaining a second objective value by performing approximate fitting by an intelligent parameter model according to the updated intermediate parameter, wherein the second objective value is a positive integer; and
- constructing a to-be-updated deep learning model based on the second objective value.

10. The method according to claim 9, further comprising:
- obtaining an updated training dataset, wherein the updated training dataset comprises at least one set of updated training transmission signals and updated training receipt signals;
- inputting the updated training dataset to the to-be-updated deep learning model; and
- training the to-be-updated deep learning model to generate an updated trained deep learning model.

11. A method of signal detection, performed by a terminal device, the method comprising:
- sending a signal and an intermediate parameter, wherein the intermediate parameter is obtained by training a meta-learning parameter learning model based on network fusion;
- initializing at least one first parameter based on a number of transmission antennas and a modulation order; and
- inputting the at least one first parameter into the meta-learning parameter learning model of network fusion to obtain the intermediate parameter.

12. The method according to claim 11, wherein inputting the at least one first parameter into the meta-learning parameter learning model of network fusion to obtain the intermediate parameter comprises:
- inputting the at least one first parameter to a prediction gradient based meta-learning model, to generate a first intermediate parameter;
- inputting the at least one first parameter to an LSTM-based (Long Short-Term Memory) meta-learning model, to generate a second intermediate parameter; and
- inputting the first intermediate parameter and the second intermediate parameter to a network fusion model, to generate the intermediate parameter.

13. The method according to claim 12, further comprising:
- receiving a model update instruction from a network side device;
- reinitializing at least one second parameter based on the number of transmission antennas and the modulation order;
- inputting the at least one second parameter to the meta-learning parameter learning model of network fusion to obtain an updated intermediate parameter; and
- sending the updated intermediate parameter.

14. A communication apparatus, comprising a processor and a memory, wherein the memory has a non-transitory computer program stored therein, and the processor executes the non-transitory computer program stored in the memory to cause the communication apparatus to:
- obtain a channel matrix by performing channel estimation on a signal received from a terminal device;
- obtain a first matrix and a first vector by performing data preprocessing on the channel matrix; and
- obtain an estimated detection signal by inputting the first matrix and the first vector to a trained deep learning model, wherein the trained deep learning model comprises N trained convolutional network models, N being a positive integer and equal to a number of transmission antennas.

15. A communication apparatus, comprising a processor and a memory, wherein the memory has a non-transitory computer program stored therein, and the processor executes the non-transitory computer program stored in the memory to cause the communication apparatus to perform the method according to claim 11.

16. A communication apparatus, comprising: a processor and an interface circuit,
- wherein the interface circuit is configured to receive code instructions and transmit the code instructions to the processor, and
- the processor is configured to execute the code instructions to perform the method according to claim 1.

17. A communication apparatus, comprising: a processor and an interface circuit,
- wherein the interface circuit is configured to receive code instructions and transmit the code instructions to the processor, and
- the processor is configured to execute the code instructions to perform the method according to claim 11.

18. A non-transitory computer readable storage medium, having instructions stored thereon, wherein the method according to claim 1 is implemented when the instructions are executed.

19. A non-transitory computer readable storage medium, having instructions stored thereon, wherein the method according to claim 11 is implemented when the instructions are executed.

* * * * *